(12) United States Patent
Kim et al.

(10) Patent No.: US 11,604,548 B2
(45) Date of Patent: Mar. 14, 2023

(54) CAPACITIVE SENSOR MESH WITH DISCONTINUITIES

(71) Applicant: Microsoft Technology Licensing, LLC, Redmond, WA (US)

(72) Inventors: Hyungsoo Kim, Seoul (KR); Rajesh Manohar Dighde, Redmond, WA (US); Younghun Paik, Bothell, WA (US); Hyun Woo Koo, Redmond, WA (US); Ying Zheng, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/333,736

(22) Filed: May 28, 2021

(65) Prior Publication Data

US 2022/0382411 A1 Dec. 1, 2022

(51) Int. Cl.
  *G06F 3/044* (2006.01)

(52) U.S. Cl.
  CPC .. *G06F 3/0443* (2019.05); *G06F 2203/04112* (2013.01)

(58) Field of Classification Search
  CPC ......... G06F 3/0443; G06F 2203/04112; G06F 3/041–0443; G06F 1/1652; G09G 3/03
  See application file for complete search history.

(56) References Cited

U.S. PATENT DOCUMENTS

| | | | |
|---|---|---|---|
| 7,295,192 B2 | 11/2007 | Hu | |
| 7,763,181 B2 | 7/2010 | Ikeda et al. | |
| 8,633,879 B2 | 1/2014 | Gu et al. | |
| 9,418,587 B2 | 8/2016 | Chaji et al. | |
| 9,547,402 B2 | 1/2017 | An | |
| 9,740,340 B1 | 8/2017 | Rosenberg et al. | |
| 2013/0300678 A1* | 11/2013 | Kang | G06F 3/0446 345/173 |
| 2015/0370121 A1 | 12/2015 | Wu et al. | |
| 2018/0122867 A1 | 5/2018 | Choe et al. | |
| 2018/0239472 A1 | 8/2018 | Park et al. | |
| 2019/0187843 A1* | 6/2019 | Ye | G06F 3/047 |
| 2020/0295092 A1* | 9/2020 | Moon | H01L 27/3276 |
| 2020/0363905 A1* | 11/2020 | Jo | H01L 51/5284 |
| 2022/0113854 A1* | 4/2022 | He | G06F 3/0443 |

FOREIGN PATENT DOCUMENTS

| | | |
|---|---|---|
| CN | 108803123 A | 11/2018 |
| WO | 2020258230 A1 | 12/2020 |

OTHER PUBLICATIONS

Kim, et al., "Color-Shift Compensation for Foldable OLED Display", Retrieved from: https://www.tdcommons.org/cgi/viewcontent.cgi?article=4467&context=dpubs_series, Jul. 2020, 12 pages.

"International Search Report and Written Opinion Issued in PCT Application No. PCT/US22/027558", dated Aug. 10, 2022, 9 Pages.

* cited by examiner

*Primary Examiner* — Temesghen Ghebretinsae
*Assistant Examiner* — Ivelisse Martinez Quiles
(74) *Attorney, Agent, or Firm* — Holzer Patel Drennan

(57) ABSTRACT

A display with a curved portion is provided. The display includes a capacitive sensor mesh layer including a plurality of cells, wherein at least a cell of the plurality of cells includes at least one cell face that has a discontinuity in the cell face based at least in part on a position of the cell on the curved portion.

19 Claims, 11 Drawing Sheets

CAPACITIVE SENSOR MESH WITH DISCONTINUITIES

BACKGROUND

Displays of electronic devices are transitioning to accommodate flexibility and curvature. Touch displays have several layers above the light-emitting elements. For example, in touch displays, a mesh layer is introduced as an element of a capacitive touch sensor.

SUMMARY

The described technology provides implementations of systems and methods for implementing curved displays. More specifically, the described technology provides implementations of systems and methods for implementing curved capacitive touch displays.

A display with a curved portion is provided. The display includes a capacitive sensor mesh layer including a plurality of cells, wherein at least a cell of the plurality of cells includes at least one cell face that has a discontinuity in the cell face based at least in part on a position of the cell on the curved portion.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1A:
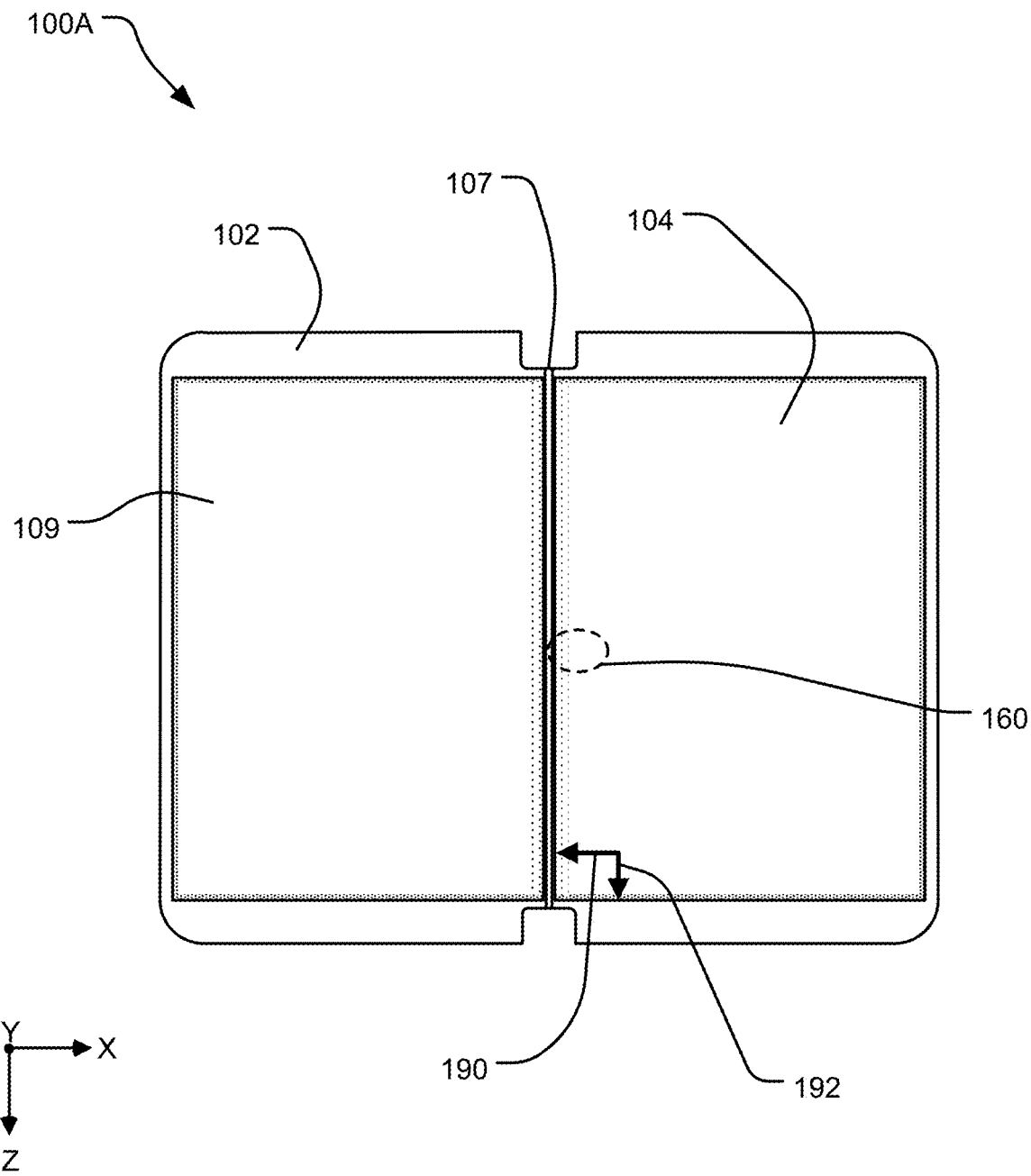
FIG. 1A illustrates a top view of an example display system.

Touch display systems, such as touch-on-encapsulation (TOE) or On-Cell Touch systems, have layers between light-emitting subpixels and meshes used as elements of the touch sensors. When a display is substantially flat and planar, a relatively uniform capacitive sensor mesh can index with the subpixels, such that very little light from the subpixels is blocked. The viewing angle is expected to be relatively orthogonal to a plane of the planar display. Where the display is curved, the viewing angle relative to the mesh and indexed subpixels is different, such that moving a viewing perspective even a small amount can affect the extent to which the mesh obscures the light emitted by the subpixels. The subpixels are also not necessarily arranged to have uniform sizes and orientations for all of the different colored subpixels. This can result in the mesh blocking subpixels of one color more than the subpixels of other colors. This non-uniform obscuring of the different colors of subpixels can result in odd coloration, especially when the display is attempting to balance the color to emit what is perceived by a user as white light.

Accordingly, where display curvature is present, the uniform mesh may significantly reduce brightness and may affect the color distribution and quality of the light emitted from the display, especially from perspectives orthogonal to flatter portions of the screen (e.g., introducing an undesirable tint in the curved region of the display). To address this undesirable effect, sensor meshes can be configured to better accommodate differences due to curvature in a display and can limit the extent to which color and brightness are affected by the curvature of the display.

A curved display may benefit from meshes that are selectively altered to better accommodate the anticipated curvature by introducing discontinuities into cell faces of the cells of the meshes. These discontinuities may include, for example, one or more of a complete gap in a cell face, a partial gap in a cell face, an omitted cell face, an angled cell face, a gap in a cell face with an angled cut, protrusions. Accounting for differences in sizes and/or orientations of subpixels may allow for a more uniform distribution of color on a curved surface of a display. For example, the length or shape of a discontinuity in a cell face of a cell may be proportional to a dimension or orientation of a subpixel that is supposed to index or otherwise orient with the cell. The introduced discontinuities may also account for differing distances between the mesh layer and the light-emitting layer or pixel layer along the curved portion of the curved display. The introduced discontinuities can also be sized or shaped differently depending on a position along the curved portion and/or the extent (e.g., magnitude) of curvature of the curved portion where the introduced discontinuities are located. Further, the size, shape, and relative position within a cell face of the introduced discontinuities can be varied along a transverse direction from a likely point or line from which a user's perspective will be centered. In that embodiment, the discontinuities may be oriented on a transverse position of a cell face in the direction of a likely user perspective. Varying geometries of discontinuities may allow for more precise control of color and light emitted from corresponding lights.

The distribution of introduced discontinuities can be strategically varied to better accommodate curved displays. The display can have a higher density of introduced discontinuities at points with greater curvature. The introduced discontinuities can also be oriented in a direction in which light is more likely to be obscured based at least in part on likely user perspectives relative to the display. The introduced discontinuities can also be distributed to allow a preferred balance of colored light. For example, different colored subpixels may be of different sizes and emit different amounts of light. The introduced discontinuities can be distributed to allow the light distribution through the discontinuities to be similar to the distribution that is presented to a user having an orthogonal perspective relative to the light-emitting surface with subpixels.

The introduced discontinuities may be elements of a larger system to limit perceived discoloration and lower brightness. For example, a computer system to which the display is communicatively coupled for display of computer system user interfaces may have processing elements that vary characteristics of the light emitted along the curved portion of the display and may do so in concert with the introduced discontinuities. The mesh may also have varying dimensions of the cells themselves along the curved portion of the display to accommodate for an intermediate layer between the mesh and the illuminating layer such that the mesh layer may have a greater surface area and/or a longer length in a direction of the curve.

Figure 1B:
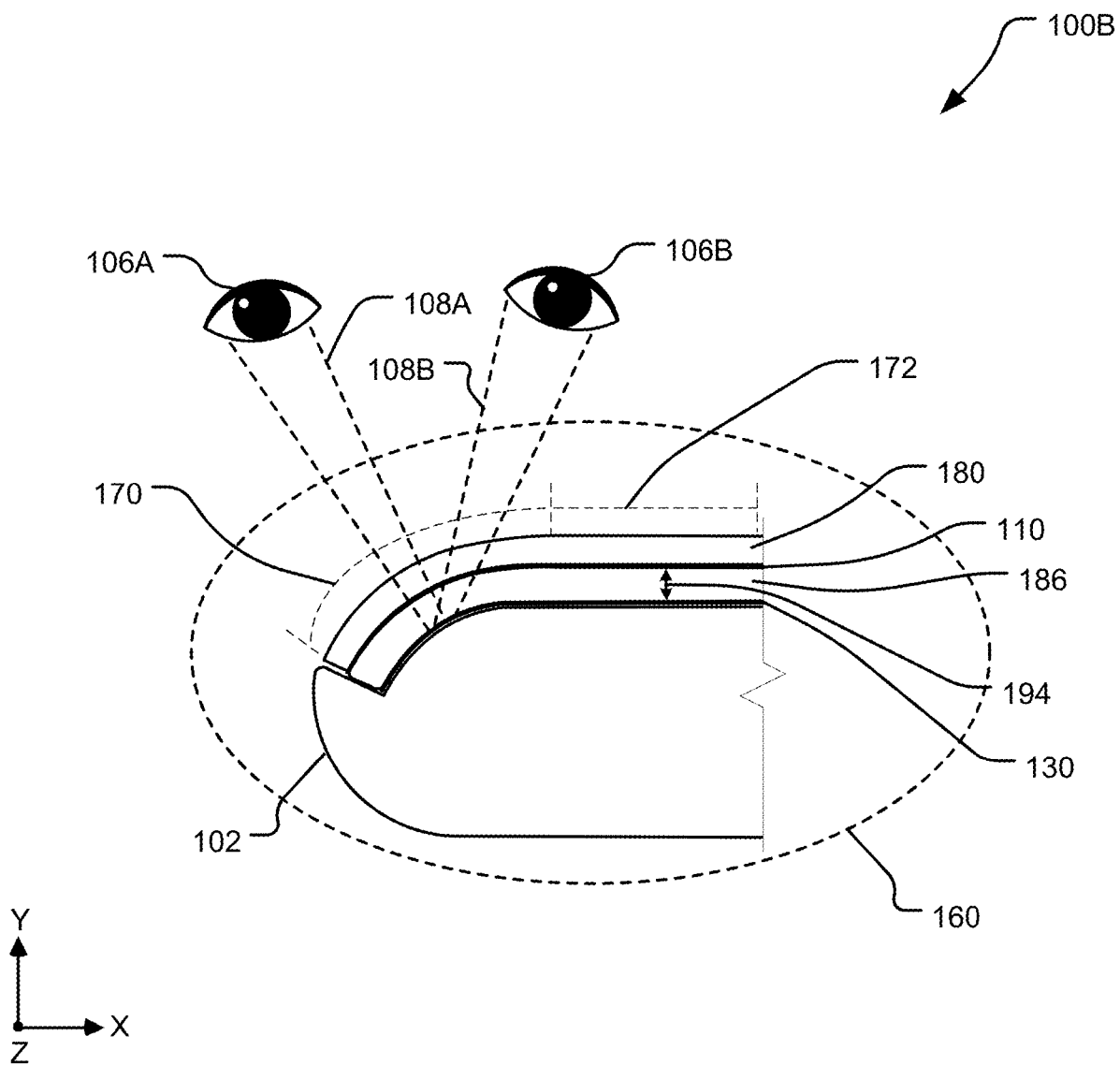
FIG. 1B illustrates a cross-sectional view of an example portion of a display system.

FIGS. 1A and 1B illustrate an example display system 100A, 100B for a device. Specifically, FIG. 1A illustrates a top view of an example display system 100A. The system 100A has a device 102 with a display 104. As illustrated, the display 104 has discoloration on a curved edge of the device. This discoloration and/or difference in brightness may be caused by elements of the display 104 partially blocking other elements of the display. In the illustrated implementation, the device 102 is a two-sided device with reflective symmetry about a coupling 107 that couples sides of the two-sided device. The display 104 may also have a reflectively symmetrical display 109 about the coupling 107. While the device 102 is shown as a two-sided device 102 with substantial reflective symmetry, other types and configurations of devices 102 and displays 104 with curvature and/or flexibility to establish curvature are contemplated.

System 100A illustrates example relative axes 190, 192 for reference relative to elements of the display 104. The curve axis 190 is an axis over which the display 104 has a curve. The transverse axis 192 is a direction over which the display is not curved. In this implementation, the transverse direction may be orthogonal to the curve direction. Implementations are contemplated with flexible screens or with curves that are not substantially uniform in a transverse axis 192, where such relative directions are less defined.

The expansion reference 160 is a reference that relates to an example expanded view illustrated in FIG. 1B. FIG. 1B illustrates a cross-sectional view of an example portion of a display system 100B. The display system 100B may be an expanded view of an implementation of the system 100A.

As can be seen, the display has a curved portion 170 and a substantially flat portion 172. In the illustrated implementation, the substantially flat portion 172 is considerably longer than the curved portion 170, but implementations are contemplated with different relative proportions. The display 104 has cover glass 180, a mesh layer 110 with a plurality of cells, an encapsulation layer 186, and an illuminating layer 130 with a plurality of lights. Implementations are contemplated in which there are more layers between elements, for example, between the cover glass 180 and the mesh layer 110. The mesh layer 110 overlays the illuminating layer 130 with the encapsulation layer 186 between the mesh layer 110 and the illuminating layer 130. The mesh layer 110 is a layer of mesh with a series of cells defined by interconnected wires, each cell having one or more cell faces. The mesh layer 110 may be a capacitive sensor mesh layer used for capacitive touch sensor functionality. The illuminating layer 130 is a layer with a plurality of lights. These lights may be, for example, pixels or subpixels. The lights may emit different colors of light, the relative brightness, position, and/or orientation of which may determine the color and brightness of light displayed to and/or perceived by a user. used for capacitive touch sensor functionality. The illuminating layer 130 is a layer with a plurality of lights. These lights may be, for example, pixels or subpixels. The lights may emit different colors of light, the relative brightness, position, and/or orientation of which may determine the color and brightness of light displayed to and/or perceived by a user.

The cells of the mesh layer 110 may be defined by crossed wires or otherwise arranged and coupled wires, which may be substantially opaque or translucent. While the cells of the mesh layer 110 may be positioned and sized to appear indexed between lights of the illuminating layer 130 from a perspective 108A, 108B, perhaps a perspective orthogonal to the illuminating layer 130, a user may have a perspective 108A, 108B where the apparent alignment between cells of the mesh layer 110 and the corresponding lights of the illuminating layer 130 is imperfect. The wires of the mesh layer may be relatively As illustrated in FIG. 1B, observers 106A and 106B have perspectives 108A and 108B, respectively, relative to a position on the curved portion 170. Observer 106A views the pixel from perspective 108A that is orthogonal to pixels at the curved portion. Because perspective 108A is orthogonal to the lights of the illuminating layer 130, observer 106A may have a view of lights on the illuminating layer on the curved portion 170 that is not obscured by elements of an unaltered mesh layer 110. This perspective 108A, however, is not one a user would normally have in the ordinary course of using the device 102. Referring back to FIG. 1A, it can be seen that, to have perspective 108A, one would have to awkwardly tilt the entire device 102 to see the lights on the curved portion without any obstruction from an unaltered mesh layer 110, and potentially experience similar discoloration or dimming on the flat portion 172. Referring back to FIG. 1B, observer 106B is in a more natural position for viewing the display 104. When viewing a flat portion 172 of the display 104, the perspective of the observer 106B may be orthogonal to the lights in the illuminating layer 130 such that the lights will appear substantially indexed with the cells of the unaltered mesh layer 110. However, perspective 108B from which observer 106B observes the curved portion 170 is not orthogonal to lights of the illuminating layer 130 at the curved portion. Consequently, observer 106B may have an obscured view of the lights of the illuminating layer 130, perhaps causing perceived discoloration and/or incorrect brightness. This can also be affected by a distance 194 between an unaltered mesh layer 110 and the illuminating layer 130 occupied by an encapsulation layer 186.

The extent of the obscuring of light emitted from a light in the illuminating layer 130 may be a factor of elements of the display 104. For instance, the thickness and shape of the wires used to make the mesh layer 110 can affect the extent light is obscured from a particular light. Where wires are cylindrical in the mesh, the dimension of thickness and height of the cell faces will be similar. The wires being of a different shape may make the thickness of the cell face and the height of the cell face different. Altering either can change the characteristics of the obscuring of light due to the particular cell relative to a light. Further, there may be intermediate layers between the illuminating layer 130 and the mesh layer 110 that affect the angle by which the thickness of a cell face of the mesh layer 110 can obscure. Still further, expanding a cell or contracting a cell in certain directions may change the angle at which the obscuring occurs.

Altering the mesh layer 110 may modify the extent to which light is obscured for particular lights in the illuminating layer 130. This may reduce the extent to which apparent brightness and/or color are affected when viewing the display 104 from a perspective such as the perspective 108B. An example of an alteration is a discontinuity introduced into one or more cell faces of one or more cells in the mesh layer 110. By introducing discontinuities in some cell faces of some cells in the mesh layer 110, certain lights in the illuminating layer 130 may be emphasized or deemphasized to limit the perceived effects of curvature in a display 104. The discontinuities may be introduced before, after, or while the mesh is formed.

Examples of discontinuities may include, for example, a gap in a cell face, a partial gap in a cell face, a widening of a cell face, a narrowing of a cell face, omitting a cell face entirely, and an angular removal of elements of a cell face. A partial gap may be distinguished from a gap in that a partial gap can be characterized as a removal of portions of the cell face such that the cell faces of the cell still circumscribe the cell.

Characteristics of the discontinuities may be based at least in part on characteristics of lights of the illuminating layer 130. For example, the lights may be designed to appear indexed within corresponding cells from a perspective orthogonal to the illuminating layer 130 at the positions of the lights. This indexing may be described as each cell having a corresponding light expected to emit light through the specific cell from the orthogonal perspective. The lights may not be uniform in size, brightness, and/or orientation. In implementations, the lights may be of different colors, with the overall pattern of lights creating a composite color scheme and brightness for the display 104.

The discontinuities may be distributed in the cells to allow specific amounts of light from each light corresponding to the cells with the discontinuities. The extent or size of a discontinuity may be based at least in part on and/or proportional to a dimension or length of the corresponding light. For example, the relative width of a discontinuity in a cell face may be consistently proportional with the width of a light in the direction of the cell face with the discontinuity throughout a curved portion 170 or along one or more of a curved axis 190 and a transverse axis 192. For example, a ratio of widths of discontinuities to widths of edges of lights facing the cell faces with the discontinuities may be consistent over certain portions of the display 104, such as one or more of on the curved portion 170 and along the curved axis 190 and the transverse axis. The discontinuities may be based at least in part on, for example, one or more of the color, size, brightness, and orientation of the lights corresponding to the cells with the discontinuities. The discontinuities may also be used in conjunction with the processor of a computer system controlling the brightness of the lights to counter any effects of the curvature on the observer's perception of the light emitted from the lights.

The distance 194 between the mesh layer 110 and the illuminating layer 130 may also vary in parts of the display 104, and the discontinuities may differ in any of magnitude, direction, orientation, and shape based at least in part on this width. The cells may also vary in size along the curved portion 170. The mesh layer 110 overlays the illuminating layer 130, so the length of cell faces in a curve axis 190 may vary with the extent of curvature. The cell faces may be longer along a curve axis 190 on a curved portion 170 than the flat portion 172. The discontinuities in a cell face at a point of greater display curvature may compensate for this by being wider relative to discontinuities on points of the display 104 with less curvature.

In implementations, the distribution of discontinuities may depend on the location of the cells having discontinuities on the display 104. For example, the curved portion 170 may have more cells with discontinuities than the flat portion 172, which could, potentially, have no or significantly fewer cells with discontinuities. The density of discontinuities may be greater where there is a greater amount of curvature on the curved portion 170.

In implementations, the distribution of discontinuities may be patterned. In one implementation, the density and/or pattern of discontinuities may be consistent in a transverse axis 192 or may be substantially reflectively symmetrical about a centerline of the display in the transverse axis 192. In implementations, the distribution and/or pattern of discontinuities may vary or be the same along the curve axis 190. Implementations are contemplated in which a discontinuity in a cell differs from any discontinuities in adjacent cells not shared with the cell. Varying the orientation between cells, perhaps in a pattern, may facilitate better color and brightness control from different viewing angles.

An example of a discontinuity pattern contemplated is an equally distributed pattern where the amount of light of each color allowed through the discontinuity is the same. An alternative pattern is one in which red cells in a row have twice as many or three times as many discontinuities as blue cells in an adjacent row. Another pattern is one in which cells corresponding to green subpixels have twice as many, one and a half times as many, or three times as many discontinuities as cells corresponding to blue and red light in two adjacent rows. Examples exist in which one or more of columns and rows of cells have a consistent distribution of discontinuities. Examples exist in which some columns or some rows of cells have no discontinuities, whether evenly distributed or distributed in greater amounts where there is less curvature.

The discontinuities may be based at least in part on orientations of the corresponding lights in the illuminating layer 130, perhaps relative to the one or more cell faces. From a particular perspective, the lights may be less obstructed than from another perspective. For example, if the device 102 is rotated ninety degrees, the effect of the discontinuities may be different. The position and orientation of the discontinuities may be based at least in part on an orientation of the lights relative to an expected viewing perspective. Further, the positioning of the discontinuities may be based at least in part on balancing the color distribution and brightness from this perspective. If multiple viewing perspectives are contemplated, the positions and orientations of the discontinuities may depend on orientations of the lights relative to multiple perspective views. Any discontinuity patterning may reflect this.

The discontinuities may be oriented substantially in a direction from which an observer 106B is expected to view the display 104. In the illustrated implementation, the flat portion 172 is considerably larger than the curved portion 170. As such, the observer 106B may be more likely to view the display from a perspective that is more or substantially orthogonal to the flat portions 172 of displays 104, 109 and centered at the coupling 107 between the first and second sides of the device 102. In this implementation, at least some discontinuities may be on cell faces oriented substantially in a direction along a curve axis 190 away from the coupling 107. In an implementation in which the device has displays 104, 109 with reflective symmetry, the discontinuities may be substantially reflectively symmetrical about the coupling 107. The symmetry may facilitate a uniform user experience when viewing both sides of the display. In an implementation, discontinuities may be oriented in a direction of a flat portion 172 relative to a curved portion 170.

In implementations with just one display 104, the observer 106 might expect to be most commonly viewing the display 104 from a center of a display 104 at an angle orthogonal to the flat portion 172 of the display 104. In this implementation, the discontinuities may be oriented along a curve axis 190 in a direction away from an edge of the other device. The discontinuities may also be oriented within a cell face in a direction from which observer 106B is more likely to view the display 104. For example, the discontinuity may or may not be centered in a cell face. The discontinuity may be oriented more towards one side of a cell face than another, perhaps in one or more of the axes 190, 192. While the cells are demonstrated in this specification as having substantially regular square or rectangular shapes, other polygonal, curved, curvilinear, and any combination thereof shaped cells are contemplated.

In the display system 100A, the device 102 is illustrated as having two sides that may be substantially reflectively symmetrical about a coupling 107. As illustrated, the device 102 may be considered to be in an open configuration. In this implementation, the two sides may fold about the coupling to make a closed configuration. In this closed configuration, a spine of the closed configuration may be defined by at least parts of the curved portions of displays 104, 109. This combined spinal display may have discontinuities configured to optimize this display from a predefined perspective to view the spine, perhaps a perspective substantially orthogonal to the coupling 107. The discontinuities may face a different direction from discontinuities used to enhance the perspective in an open configuration. In implementations, the discontinuities of cells on the spine may account for both predefined perspectives associated with the open and closed configuration. Alternatively or additionally, different cells may have different discontinuities to account for the different perspectives, perhaps in regular and/or alternating patterns. This may reduce perceived discoloration or inconsistent brightness in both the open and closed configurations.

Figure 2:
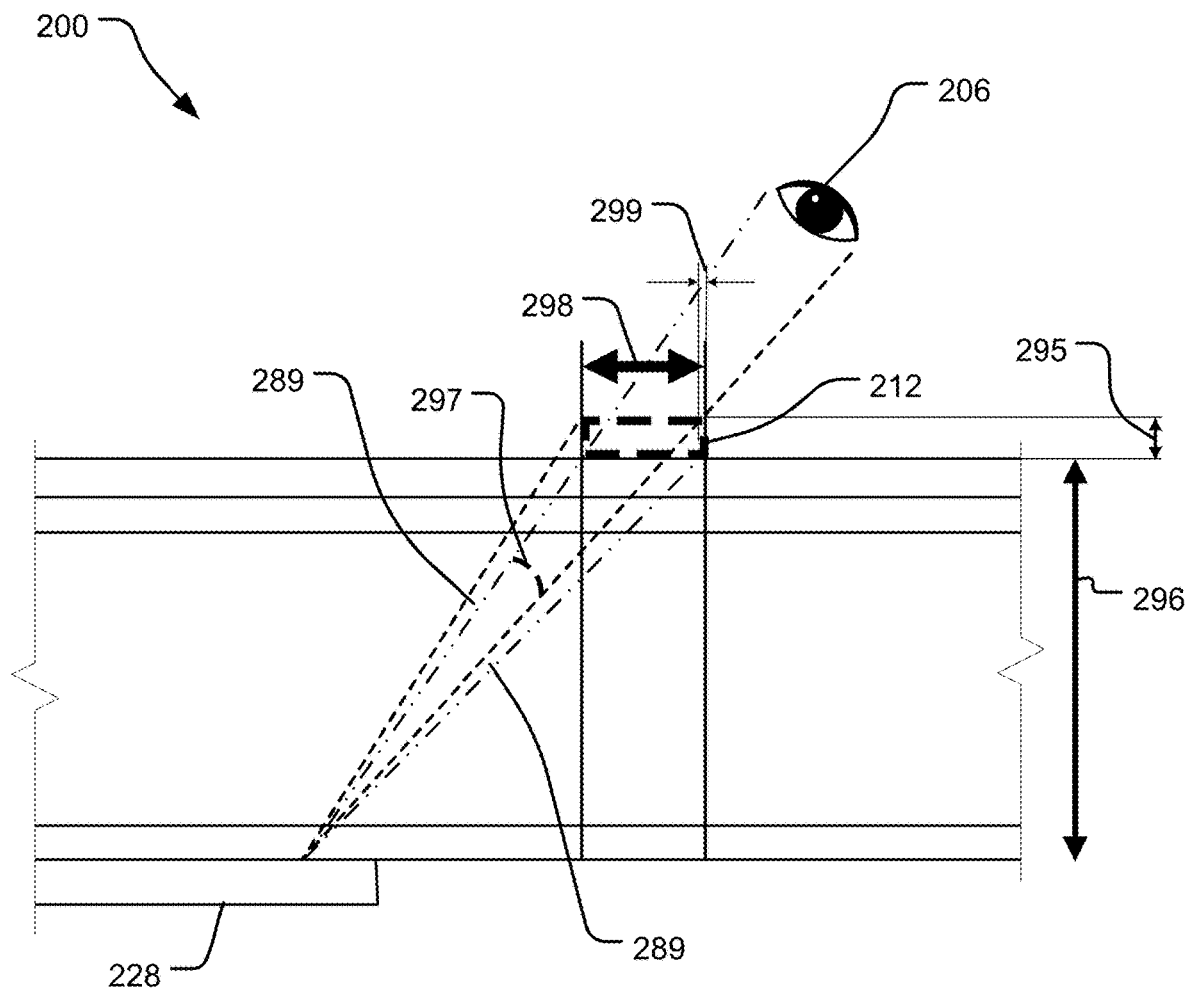
FIG. 2 illustrates a cross-sectional view of an example display system

FIG. 2 illustrates a cross-sectional view of an example display system 200. This may represent a view to demonstrate how a cell 212 of a mesh layer can obscure light from a light 228 of a light-emitting layer. The cell 212 has an open width 298 between cell faces. Each cell face has a height 295 and a width 299. In implementations where the wire is cylindrical, the height 295 and width 299 may, at least before discontinuities are introduced, be the same in the same cell 212. An observer 206 attempts to view light emitted from the light 222. The light 228 emits in the direction of observer 206 through the cell 212. The observer 206 will see the light in the viewable angle 297, but the light emitted through obstructed perspective 289 may be obscured by the cell 212. The viewable angle 297 can be increased or otherwise modified by modifying different factors that affect the viewable angle 297. For instance, the distance 296 between the cell 212 and the light 228 may be modified. The width of the cell 212 in the direction from which the observer 206 is expected to view the light 228 may also be modified. For example, increasing the width 298 of the cell relative to the width 299 of the cell face may reduce the relative amount the wires of the mesh obscure emissions from light 228. This may have the effect of increasing cell size in at least one dimension, perhaps based at least in part on an extent of curvature at which the cell 212 and/or the light 222 is located. The width 299 and/or height 295 of the cell face of the cell 212 can be modified by introducing discontinuities. For example, one or more of width 299 and height 295 may be increased to reduce the amount of light contributed by light 228 or decreased to increase the amount of light contributed by light 228. The relative thinning or thickening may be a result of adding or removing material in a formed mesh or forming the mesh with the relatively narrowed and/or thickened cell faces. The discontinuities may also be gaps or partial gaps in the cell face of the cell 212. The gaps may be proportional to the size of the light in the direction of the particular cell face. The gaps may be complete or may be partial (like a thinning in a direction of the height 295) such that the cell faces still circumscribe the cell 212. The gaps or partial gaps may be formed initially when the mesh or its constituent wires are formed or may be introduced after the mesh is formed by removing or adding material. The discontinuities may increase the viewable angle 297 relative to the sizes of one or more of the cell 212 and the light 228. forming the mesh with the relatively narrowed and/or thickened cell faces. The discontinuities may also be gaps or partial gaps in the cell face of the cell 212. The gaps may be proportional to the size of the light in the direction of the particular cell face. The gaps may be complete or may be partial (like a thinning in a direction of the height 295) such that the cell faces still circumscribe the cell 212. The gaps or partial gaps may be formed initially when the mesh or its constituent wires are formed or may be introduced after the mesh is formed by removing or adding material. The discontinuities may increase the viewable angle 297 relative to the sizes of one or more of the cell 212 and the light 228.

Figure 3:
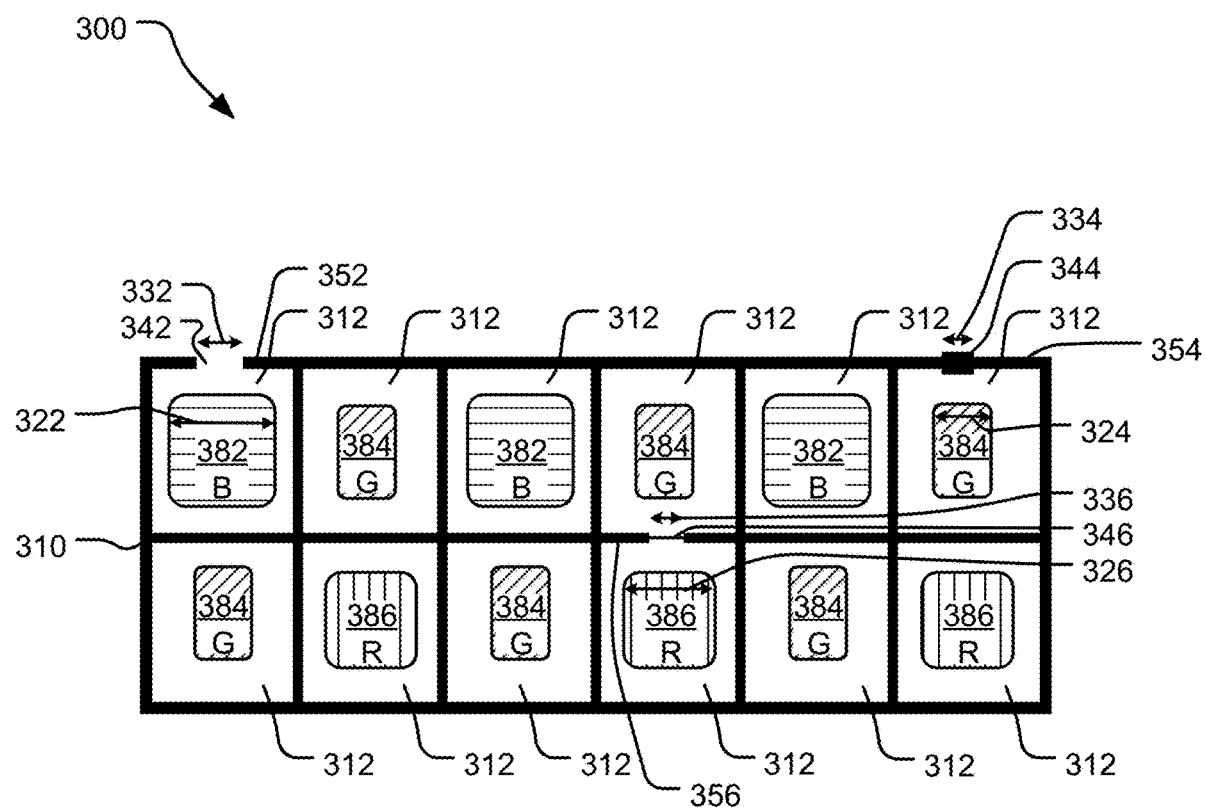
FIG. 3 illustrates a top view of an example display system.

FIG. 3 illustrates a top view of an example display system 300. System 300 has a mesh layer 310 that overlays a light-emitting layer. The light-emitting layer has blue lights 382, green lights 384, and red lights 386. In various implementations, the lights 382, 384, 386 may be pixels or subpixels. In this implementation, from a top view perspective, the lights 382, 384, 386 appear to index within the cells 312 of the mesh layer 310. A cell 312 with different discontinuities 342, 344, and 346 are shown. The first discontinuity 342 in a cell 312 with a blue light 382 having a blue light width 322 is a gap in a cell face 352 having a gap width 332. The second discontinuity 344 in a cell 312 with a green light 384 having a green light width 324 is a thickening of a cell face 354 having a thickening width 334. The third discontinuity 346 in a cell with a red light 386 having a red light width 326 is a thinning of a cell face 356 having a thinning width 346. The ratio of the discontinuity widths 332, 334, and 336 to the light widths 322, 324, and 326, respectively, may be the same or substantially the same. The widths 322, 324, and 326 may be the widths of the light 382, 384, 386 faces that face the cell faces with discontinuities 342, 344, and 346, respectively. While the discontinuity 344 (widening) and the discontinuity 346 (thinning) are illustrated only from a top perspective, the thinning or thickening may be additionally or alternatively from other perspectives, for example, one or more of from an expected viewing perspective, an angled perspective, and from a side-view perspective. Also, while the first discontinuity 342 is shown as a complete gap, the gap may only be partial such that the cell faces around the cell still circumscribe the cell. The extent of any discontinuity 342, 344, 346 may be determined based at least in part on a position of the cell 212 with the discontinuity 342, 344, 346 on a curved portion and/or the extent of curvature of a curved portion of the display at that position. on a curved portion and/or the extent of curvature of a curved portion of the display at that position.

Figure 4:
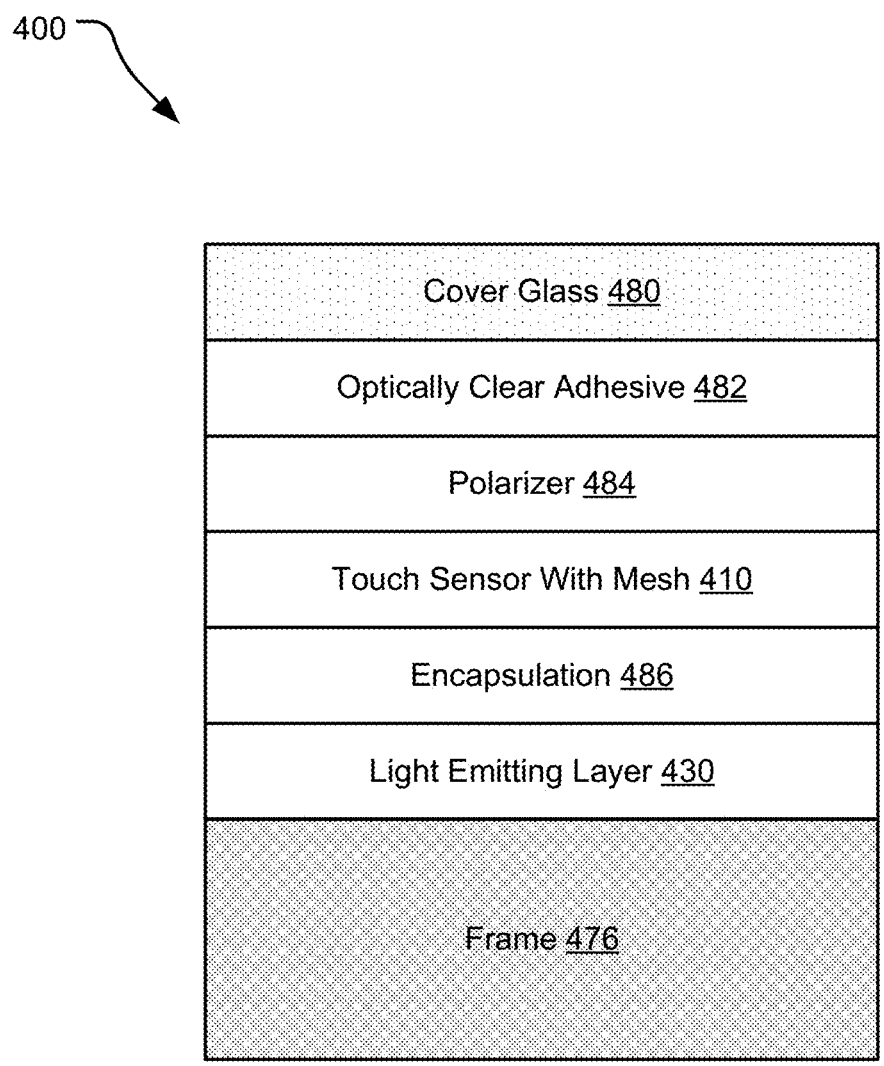
FIG. 4 illustrates a cross-sectional view of another example display system.

FIG. 4 illustrates a cross-sectional view of another example display system 400. In an order from the frame 476 of the display device towards the exterior towards which light is emitted from the display, the layers are a light-emitting layer 430, an encapsulation 486, a capacitive layer with a mesh layer 410, a polarizing layer 484, an optically clear adhesive layer 482 and a cover glass 480. The mesh layer 410, the cover glass 480, the encapsulation 486, and the light-emitting layer 430 may be implementations of the mesh layer 110, the cover glass 180, the encapsulation layer 186, and the illuminating layer 30, respectively. The display system 400 may not have all of the layers or may have more layers in alternative implementations, with at least the mesh layer 410 overlaying the light-emitting layer 430 to allow the light-emitting layer 430 to emit light through the mesh layer 410. The cover glass 480 is a glass or other transparent or translucent solid that represents an external layer of the display through which light is emitted. The optically clear adhesive 482 is an adhesive that passes light and binds the cover glass 489 to the polarizer layer 484. The polarizer layer 484 polarizes light entering from the outside so that it is not reflected back from the display. The touch sensor with mesh 410 has the capacitive sensor mesh layer. The encapsulation 486 is an intermediate layer between the touch sensor with mesh 410 and the light-emitting layer 430. The encapsulation 486 is a moisture and air barrier that protects the light-emitting layer 430. The light-emitting layer 430 is a layer with lights that emit through the encapsulation 486, the touch sensor with mesh 410, the polarizer layer 484, the optically clear adhesive 482, and the cover glass 480. In implementations, the lights do not emit through the frame 476. The frame 476 provides support for the layers used to pass light. In implementations, the frame 476 may be substantially opaque or translucent, but implementations are contemplated in which the frame may pass emitted light from the light-emitting layer 430.

Figure 5:
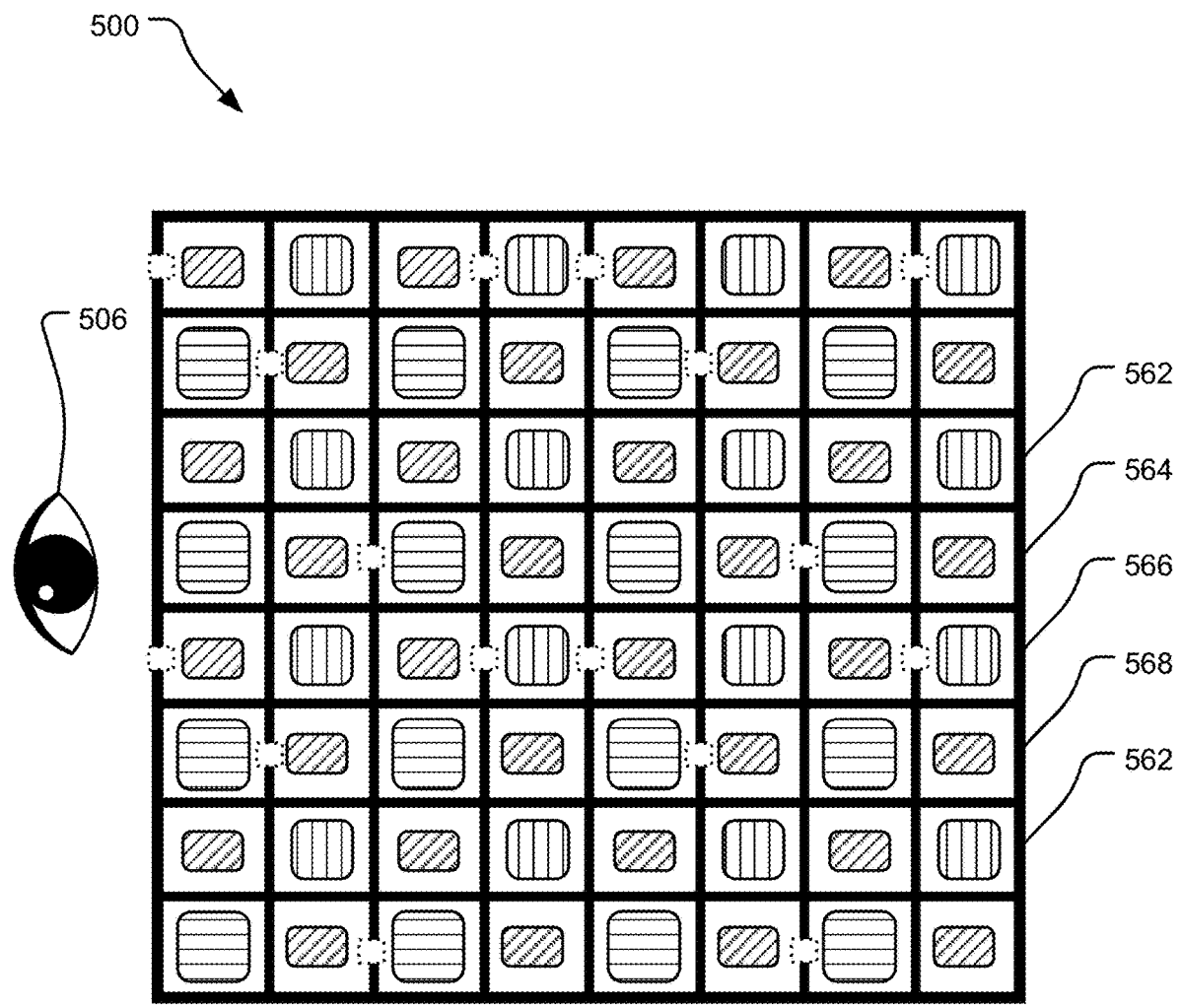
FIG. 5 illustrates a top view of an example mesh layer discontinuity pattern for a display system.

FIG. 5 illustrates a top view of an example mesh layer discontinuity pattern 500 for a display system. This implementation of a discontinuity pattern 500 has a repeating pattern of four rows. The pattern can be seen as beginning with a first row 562 with no discontinuities. The second row 564 has a discontinuity between a cell aligning with a larger blue light and a cell aligning with a smaller green light on a cell face on the side of the observer 506. There are then two consecutive cells without the discontinuity. Then the pattern repeats within the second row 564. The third row 566 has three consecutive cells representing two outside cells aligning with smaller green lights and a central cell aligning with a larger red light. The discontinuities are in the faces shared by the central cell aligned with the red light and the external cells aligning with green lights. The discontinuity on the side of the observer 506 is in a same column of cells as the discontinuity of the second row 564, except on the cell face further from the observer 506. There is then one cell aligning with a red light after that in the third row 566. Then, the pattern repeats within the third row 566. The fourth row 568 has a repeating pattern of blue and green lights with the blue lights being larger than the green lights. In the fourth row 568, there is a discontinuity between a cell aligned with a blue light and a green light on a cell face of a cell aligned with a blue light on the face that is distant from the observer 506. The discontinuity is in the same column as the discontinuity most distant from the observer 506 in the third row 566, but the discontinuity in the fourth row is on the side of the column distant from the observer 506. The fourth row 568 has two more cells without discontinuities, and the pattern repeats. The next row is a repeat of the pattern being the same as the first row 562. This pattern may repeat every four rows. Implementations are considered in which there are more intermediate rows without discontinuities, like the first row 562. Implementations are contemplated where one or more intermediate rows having no discontinuities can be placed between one or more of the rows 562, 564, 566, and 568. This mesh layer discontinuity pattern 500 may facilitate a distributed and balanced color and brightness performance over the curved portion of the display. Although illustrated as uniform for simplicity, the discontinuities may differ in size, shape, and orientation as recited in this specification.

Figure 6:
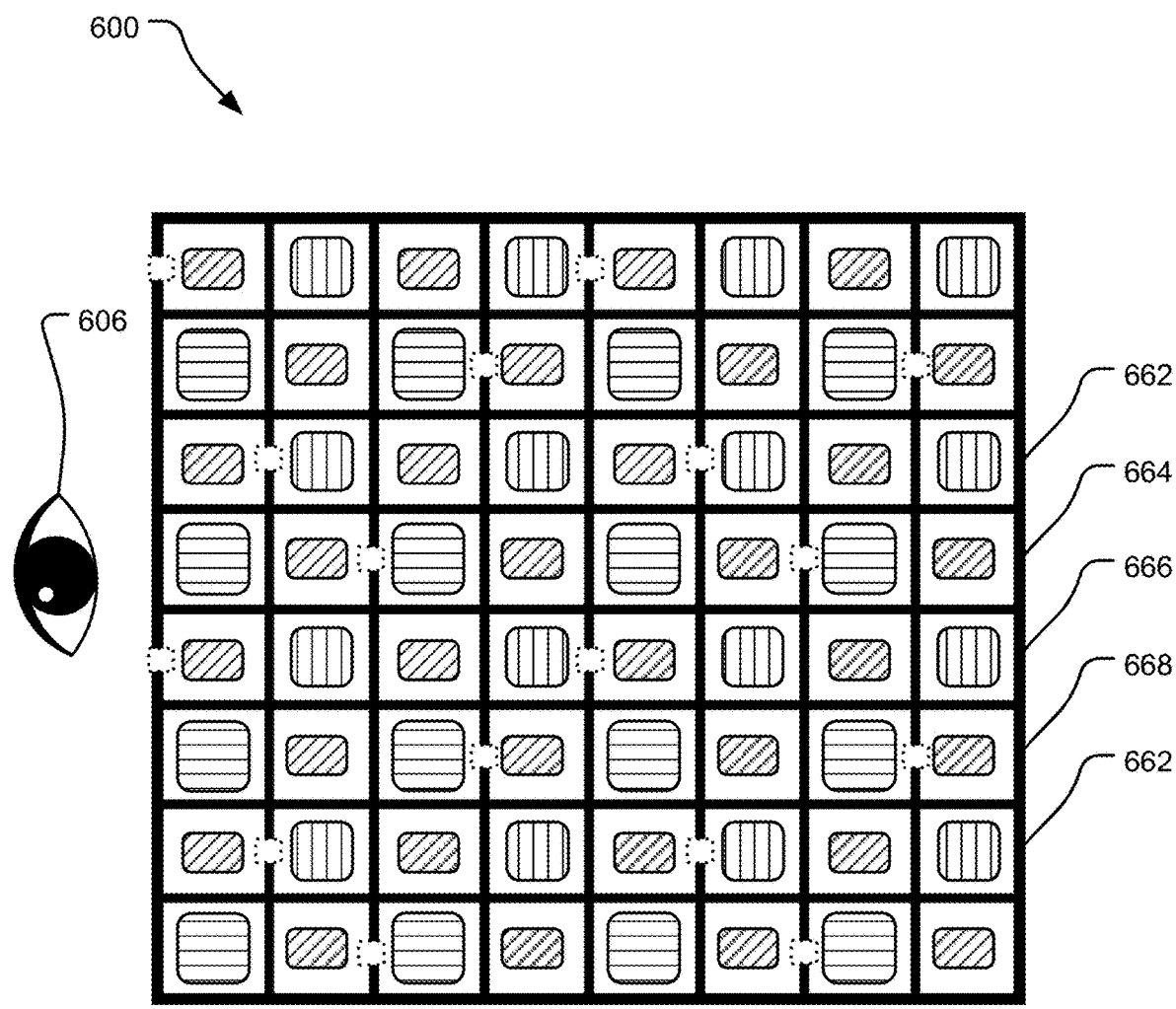
FIG. 6 illustrates a top view of another example mesh layer discontinuity pattern for a display system.

FIG. 6 illustrates a top view of another example mesh layer discontinuity pattern 600 for a display system. The first row 662 has a repeating alternating pattern of cells aligned with smaller green lights and cells aligned with larger red lights. A discontinuity of this row 662 is in a cell face further from the observer 606 in the green aligned cell and closer to the observer in the red aligned cell. The next two consecutive cells have no discontinuities, and then the pattern repeats in the first row 662. The second row 664 has cells that alternatively align with larger blue lights and smaller green lights. The discontinuities are in the same column of cells as the first layer, except that the discontinuities in the second row 664 are on a side of the column distant from the observer 606. The cells with the shared discontinuity in the second row 664 are followed by two consecutive cells without discontinuities, and the pattern repeats. The third row 666 has a repeating alternating pattern of cells aligned with smaller green lights and cells aligned with larger red lights. The third row 666 has the discontinuity on a cell face of a red-aligned cell that is distant from the observer 606 and that is shared with a red-aligned cell face on a side closer to the observer 606. This discontinuity is at a position from a columnal perspective that is aligned with where the two consecutive cells in the second row 664 with no discontinuities have a common face. The third row 666 continues with two cells having no discontinuities, and then the pattern repeats. The fourth row 668 has cells that alternatively align with larger blue lights and smaller green lights. The fourth-row discontinuities are in a cell face on the distal side of a blue-aligned cell from an observer and closer side to the observer in the green-aligned cell. The discontinuities in the fourth row 668 are in the same cell column as the discontinuities of the third row 666, except that the discontinuities in the fourth row 668 are on the side of the column closer to the observer 606. Fourth row 668 continues with two consecutive cells without discontinuities, and then the pattern repeats in the fourth row 668. The pattern of rows repeats such that the next row is the same as the first row 662. Implementations are contemplated where one or more intermediate rows having no discontinuities can be placed between one or more of the rows 662, 664, 666, and 668. This mesh layer discontinuity pattern 600 may facilitate a distributed and balanced color and brightness performance over the curved portion of the display. Although illustrated as uniform for simplicity, the discontinuities may differ in size, shape, and orientation as recited in this specification.

Figure 7:
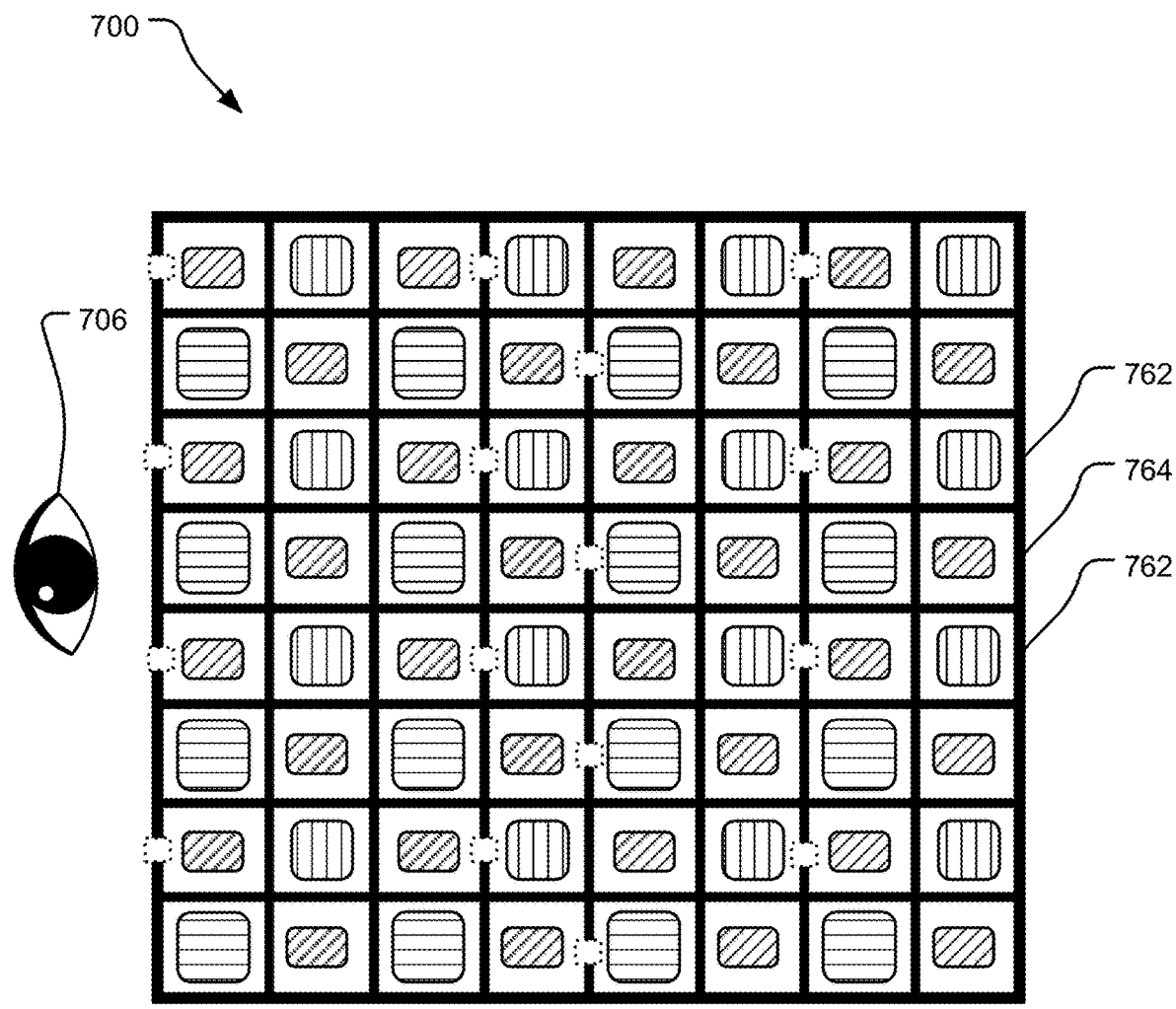
FIG. 7 illustrates a top view of still another example mesh layer discontinuity pattern for a display system.

FIG. 7 illustrates a top view of still another example mesh layer discontinuity pattern 700 for a display system. In this repeating pattern, the pattern repeats every two rows. The first row 762 has a repeating alternating pattern of cells aligned with smaller green lights and cells aligned with larger red lights. The discontinuities are shared between a distant cell face from an observer 706 of a green aligned cell that is shared with a side of a red aligned cell closer to the observer 706. The first row 762 next has a green-aligned cell. The pattern in the first row 762 then repeats. The second row 764 has cells that alternatively align with larger blue lights and smaller green lights. The fourth-row discontinuities are in a cell face on the side of a blue-aligned cell closer to an observer 706 and further from the observer 706 in the green-aligned cell. The second row 764 then has four consecutive cells without discontinuities, and the pattern repeats within the second row 764. The next row is the same as the first row 762 in a repeating pattern. Implementations are contemplated where one or more intermediate rows having no discontinuities can be placed between one or more of the rows 762 and 764. This mesh layer discontinuity pattern 700 may facilitate a distributed and balanced color and brightness performance over the curved portion of the display. Although illustrated as uniform for simplicity, the discontinuities may differ in size, shape, and orientation as recited in this specification.

Figure 8:
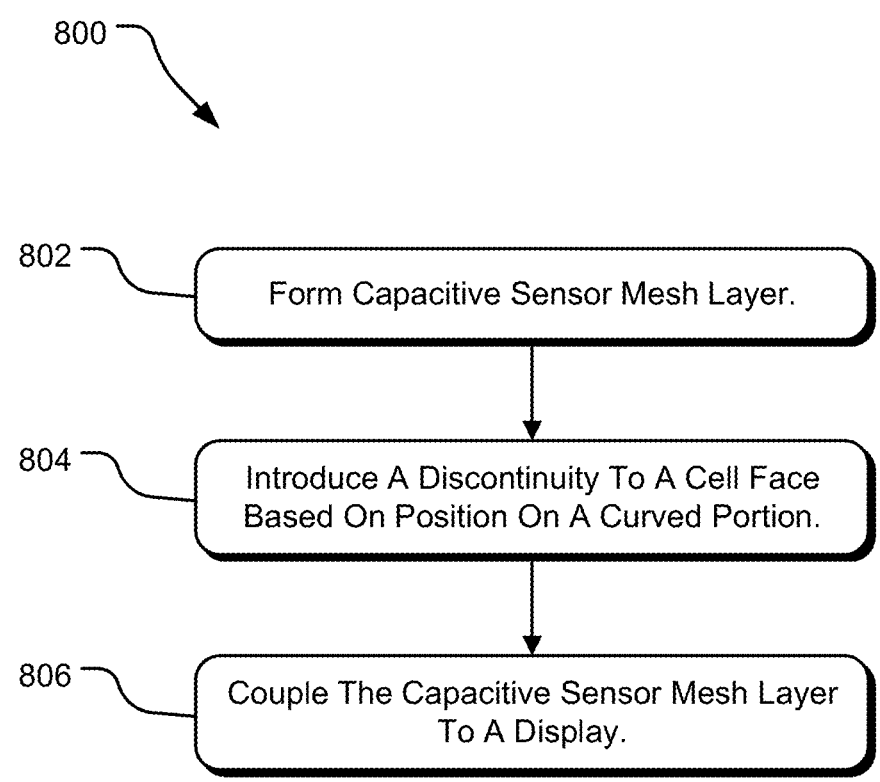
FIG. 8 illustrates an example operations of making a display system.

FIG. 8 illustrates an example operations 800 of making a display system. A forming operation 802 forms a capacitive sensor mesh layer. The forming may involve crossing wires and coupling the crossed wires. The manner in which the wires are crossed depends on the configurations of the mesh. For example, the wires may be crossed in a cross pattern that forms square cells, rectangular cells, rhomboid cells, other polygonal cells, circular cells, and/or curvilinear cells. Some portions of the mesh layer may be formed with cells of a uniform size. Other portions of the mesh layer may be formed with elongate or otherwise different cell sizes. For example, when a portion of a mesh layer is intended to be used on a curved portion of a display, the cells may be elongated to allow for better alignment or indexing with overlayed lights of a light-emitting layer, for example, from an orthogonal perspective or from an expected viewing perspective relative to the light-emitting layer. Because of an intermediate layer between the mesh layer and the light layer, perhaps an encapsulation, the portion of the mesh that will overlay the light-emitting layer may have to stretch a greater distance along the curve to appropriately align or index with corresponding lights. This may mean cells of the mesh are stretched in a curved direction relative to the cell widths in a transverse direction. or from an expected viewing perspective relative to the light-emitting layer. Because of an intermediate layer between the mesh layer and the light layer, perhaps an encapsulation, the portion of the mesh that will overlay the light-emitting layer may have to stretch a greater distance along the curve to appropriately align or index with corresponding lights. This may mean cells of the mesh are stretched in a curved direction relative to the cell widths in a transverse direction.

An introducing operation 804 introduces discontinuities to a cell face based at least in part on a position on a curved portion of a display. The introducing operation 804 may introduce any number of discontinuities to any number of cells in any number of arrangements and orientations. The discontinuities may be introduced by, for example, removing material from an existing mesh, as a component of the forming operation 802, may be introduced when forming the wires used in the forming operation 802, or may be introduced to the wires used to form the mesh before the forming operation 802.

Examples of discontinuities introduced by introducing operation 804 may include, for example, a gap in a cell face, a partial gap in a cell face, a widening of a cell face, a narrowing of a cell face, omitting a cell face entirely, and an angular removal of elements of a cell face. A partial gap may be distinguished from a gap in that a partial gap can be characterized as portions remaining after removal of portions of the cell face such that the cell faces of the cell still circumscribe the cell.

Characteristics of the discontinuities may be based at least in part on characteristics of lights of the illuminating layer. For example, the lights may be designed to appear indexed within corresponding cells from a perspective orthogonal to the illuminating layer at the positions of the lights. This indexing may be described as each cell having a corresponding light expected to emit light through the specific cell from the orthogonal perspective. The lights may not be uniform in size, brightness, and/or orientation. In implementations, the lights may be of different colors with the overall pattern of lights creating a composite color scheme and brightness for the display.

The discontinuities may be distributed in the cells to allow specific amounts of light from each light corresponding to the cells with the discontinuities. The extent or size of a discontinuity may be based at least in part on and/or proportional to a dimension or length of the corresponding light. For example, the relative width of a discontinuity in a cell face may be consistently proportional with the width of a light in the direction of the cell face with the discontinuity throughout a curved portion or along one or more of a curved axis and transverse axis. For example, a ratio of widths of discontinuities to widths of edges of lights facing the cell faces with the discontinuities may be consistent over certain portions of the display, such as one or more of on the curved portion and along the curved axis and the transverse axis. Making the discontinuities proportional to geometries of the lights may allow for better distribution of color and better brightness control in the display. The discontinuities may be based at least in part on, for example, one or more of the color, size, brightness, and orientation of the lights corresponding to the cells with the discontinuities. The discontinuities may also be used in conjunction with the processor of a computer system controlling the brightness of the lights to counter the effects of the curvature on the observer's perception of the light emitted from the lights.

The distance between the mesh layer and the illuminating layer may also vary in parts of the display, and the discontinuities may differ in any of magnitude, direction, orientation, and shape based at least in part on this width. The cells may also vary in size along the curved portion. The mesh layer overlays the illuminating layer, so the length of cell faces in a curve axis may vary with the extent of curvature. The cell faces may be longer along a curve axis on a curved portion than the flat portion. The discontinuities in a cell face at a point of greater display curvature may compensate for this by being wider relative to discontinuities on points of the display with less curvature.

In implementations, the distribution of discontinuities may depend on the location of the cells having discontinuities on the display. For example, the curved portion may have more cells with discontinuities than the flat portion, which could, potentially, have no or significantly fewer cells with discontinuities. The density of discontinuities may be greater where there is a greater amount of curvature on the curved portion.

In implementations, the distribution of discontinuities may be patterned. In one implementation, the density and/or pattern of discontinuities may be consistent in a transverse axis or may be substantially reflectively symmetrical about a center-line of the display in the transverse axis. In implementations, the distribution and/or pattern of discontinuities may vary or be the same along the curve axis. Implementations are contemplated in which a discontinuity in a cell differs from any discontinuities in adjacent cells not shared with the cell.

An example of a discontinuity pattern contemplated is an equally distributed pattern where the amount of light of each color allowed through the discontinuity is the same. An alternative pattern is one in which red cells in a row have twice as many or three times as many discontinuities as blue cells in an adjacent row. Another pattern is one in which cells corresponding to green subpixels have twice as many, one and a half times as many, or three times as many discontinuities as cells corresponding to blue and red light in two adjacent rows. Examples exist in which one or more of columns and rows of cells have a consistent distribution of discontinuities. Examples exist in which some columns or some rows of cells have no discontinuities, whether evenly distributed or distributed in greater amounts where there is less curvature.

The discontinuities may be oriented substantially in a direction from which an observer is expected to view the display. In the illustrated implementation, the flat portion is considerably larger than the curved portion. As such, the observer may be more likely to view the display from a perspective that is more or substantially orthogonal to the flat portions of displays and centered at the coupling between the first and second sides of the device. In this implementation, at least some discontinuities may be on cell faces oriented substantially in a direction along a curve axis away from the coupling. In an implementation in which the device has displays with reflective symmetry, the discontinuities may be substantially reflectively symmetrical about the coupling. In an implementation, discontinuities may be oriented in a direction of a flat portion relative to a curved portion. The orientation of the discontinuities towards the flat portion may be desirable when the user is more likely to have a perspective substantially orthogonal to the flat portion with the curved portion causing light and color obscuring when emitting through the mesh layer.

In implementations with just one display, the observer might expect to be most commonly viewing the display from a center of a display at an angle orthogonal to the flat portion of the display. In this implementation, the discontinuities may be oriented along a curve axis in a direction away from an edge of the other device. The discontinuities may also be oriented within a cell face in a direction from which the observer is more likely to view the display. For example, the discontinuity may or may not be centered in a cell face. The discontinuity may be oriented more towards one side of a cell face than another, perhaps in one or more of the axes. While the cells are demonstrated in this specification as having substantially regular square or rectangular shapes, other polygonal, curved, curvilinear, and any combination thereof shaped cells are contemplated.

A coupling operation 806 couples the capacitive sensor mesh layer to a display of the display system. The coupling operation 806 may be accomplished using, for example, an encapsulation, an optically clear adhesive, screws, rivets, or slotted fittings. The coupling operation 806 may couple the capacitive sensor mesh layer to the display to overlay a light-emitting layer. The coupling operation 806 may position the capacitive sensor mesh layer to align or index with lights of the light layer from a predefined perspective, for example, from an orthogonal perspective relative to the light-emitting layer or from an expected viewing perspective. The coupling operation 806 may couple the capacitive sensor mesh layer to appropriately align discontinuities and/or other variations of the cells based at least in part on one or more of a position on a curved portion of the display and an extent of curvature of the curved portion.

Figure 9:
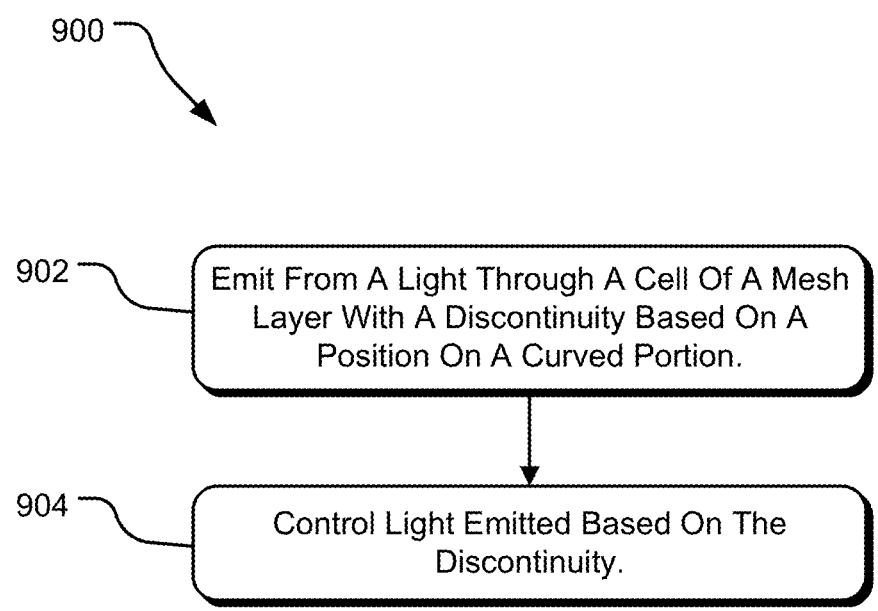
FIG. 9 illustrates an example operations of using a display system with a curved portion.

FIG. 9 illustrates an example operations 900 of using a display system with a curved portion. An emitting operation 902 emits from light through a cell of a mesh layer with a discontinuity based at least in part on a position on a curved portion. The light may be a light of a plurality of lights in a light-emitting layer. The lights may each have different colors and may each have different brightness characteristics, sizes, relative numbers, and orientations. For example, there may be twice as many green lights as blue or red lights. In implementations without discontinuities, the lights might have to emit different amounts of light to compensate for light blocked by the mesh layer. Discontinuities may modify the extent to which certain lights emit.

A controlling operation 904 controls the light emitted based at least in part on the discontinuity. Discontinuities may be used to modify the extent to which light is obscured by the mesh layer. For example, if specific colors are emphasized when an unaltered mesh blocks light, those colors may be further blocked by discontinuities. If specific colors are deemphasized by an unaltered mesh, those colors may be further emphasized using discontinuities. The discontinuities may also be oriented or otherwise directed towards a pre-defined perspective to amplify or reduce the light emitted to that particular perspective. The display may have or be coupled to a computer system with a processor and memory, The processor may have light controlling programming that accounts for the discontinuities and alters the brightness of different lights depending on the discontinuities. The processor may not have to use as much light to compensate for the mesh layer if discontinuities are present, perhaps reducing perceived discoloration and varied brightness from predefined perspectives. If the discontinuities are patterned, the controlling operation 904 may use a corresponding light pattern of brightness to account for discontinuities in the pattern.

Figure 10:
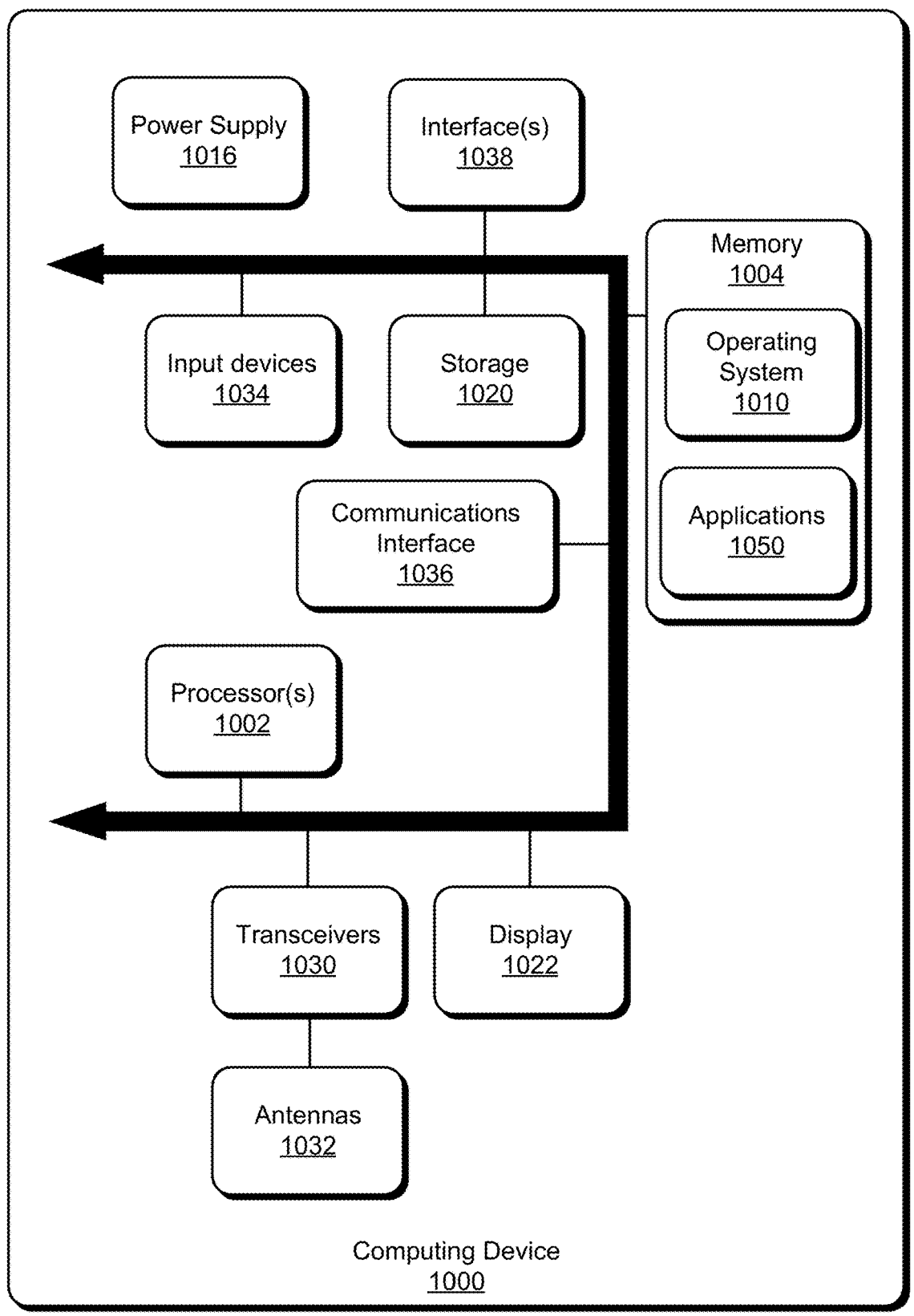
FIG. 10 illustrates an example computing device for implementing the features and operations of the described technology.

FIG. 10 illustrates an example computing device 1000 for implementing the features and operations of the described technology. The computing device 1000 may embody a remote-control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 1000 includes one or more processor(s) 1002 and a memory 1004. The memory 1004 generally includes both volatile memory (e.g., RAM) and nonvolatile memory (e.g., flash memory). An operating system 1010 resides in the memory 1004 and is executed by the processor(s) 1002. 02.

In an example computing device 1000, as shown in FIG. 10, one or more modules or segments, such as applications 1050 and light controlling programming are loaded into the operating system 1010 on the memory 1004 and/or storage 1020 and executed by processor(s) 1002. The storage 1020 may include one or more tangible storage media devices and may store light controlling, display, or discontinuity data locally and globally unique identifiers, requests, responses, and other data and be local to the computing device 1000 or may be remote and communicatively connected to the computing device 1000.

The computing device 1000 includes a power supply 1016, which is powered by one or more batteries or other power sources and which provides power to other components of the computing device 1000. The power supply 1016 may also be connected to an external power source that overrides or recharges the built-in batteries or other power sources.

The computing device 1000 may include one or more communication transceivers 1030, which may be connected to one or more antenna(s) 1032 to provide network connectivity (e.g., mobile phone network, Wi-Fi®, Bluetooth®) to one or more other servers and/or client devices (e.g., mobile devices, desktop computers, or laptop computers). The computing device 1000 may further include a network adapter 1036, which is a type of computing device. The computing device 1000 may use the adapter and any other types of computing devices for establishing connections over a wide-area network (WAN) or local-area network (LAN). It should be appreciated that the network connections shown are examples and that other computing devices and means for establishing a communications link between the computing device 1000 and other devices may be used.

The computing device 1000 may include one or more input devices 1034 such that a user may enter commands and information (e.g., a keyboard or mouse). These and other input devices may be coupled to the server by one or more interfaces 1038, such as a serial port interface, parallel port, or universal serial bus (USB). The computing device 1000 may further include a display 1022, such as a touch screen display. In implementations, the display 1022 may be an implementation of one or more of display systems 100, 200, 300, and 400. In implementations, the display 1022 may have one or more of discontinuity patterns 500, 600, and 700. In implementations, the display 1022 may be at least partially made by example operations 800. In implementations, the display 1022 may be used according to example operations 900.

The computing device 1000 may include a variety of tangible processor-readable storage media and intangible processor-readable communication signals. Tangible processor-readable storage can be embodied by any available media that can be accessed by the computing device 1000 and includes both volatile and nonvolatile storage media, removable and non-removable storage media. Tangible processor-readable storage media excludes communications signals (e.g., signals per se) and includes volatile and nonvolatile, removable, and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, other magnetic storage devices, or any other tangible medium which can be used to store the desired information and which can be accessed by the computing device 1000. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physical controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

The logical operations making up embodiments of the invention described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

An example display with a curved portion is provided. The display includes a capacitive sensor mesh layer including a plurality of cells, wherein at least a cell of the plurality of cells includes at least one cell face that has a discontinuity in the cell face based at least in part on a position of the cell on the curved portion.

Another example display of any preceding display is provided, the display further including an illuminating layer with a plurality of lights, wherein the capacitive sensor mesh layer overlays the illuminating layer in the display and wherein a characteristic of the discontinuity is based at least in part on a position of the cell relative to the illuminating layer.

Another example display of any preceding display is provided, wherein the characteristic of the discontinuity is a dimension of the discontinuity.

An example display of any preceding display is provided, wherein the display is an element of a computing device having a processor and a memory, the processor to execute functions stored in the memory, the processor to control a characteristic of a light of the plurality of lights based at least in part on the discontinuity.

Another example display of any preceding display is provided, wherein one or more cells of the plurality of cells are each aligned with a corresponding light of the plurality of lights, and wherein the position of the cell relative to the illuminating layer is a position of the cell relative to a light corresponding to the cell.

Another example display of any preceding display is provided, wherein the characteristic of the discontinuity is proportional to a characteristic of the light corresponding to the cell.

Another example display of any preceding display is provided, wherein the characteristic of the discontinuity is based at least in part on an orientation of the corresponding light.

Another example display of any preceding display is provided, wherein the characteristic of the discontinuity is a magnitude of the discontinuity, and wherein the magnitude of the discontinuity is based at least in part on a magnitude of curvature at the position.

Another example display of any preceding display is provided, wherein a characteristic of the discontinuity in the cell face is based at least in part on a transverse position of the cell on the display.

Another example display of any preceding display is provided, wherein the discontinuity in the cell face differs from discontinuities of cell faces of cells adjacent to the cell that are not shared between the cell and the cells adjacent to the cell.

Another example display of any preceding display is provided, wherein the discontinuity is one or more of a gap in the cell face, a partial gap in the cell face, a widening of the cell face, and a narrowing of the cell face.

Another example display of any preceding display is provided, wherein a distribution of cells with discontinuities is based at least in part on a magnitude of curvature of the curved portion of the display.

Another example display of any preceding display is provided, wherein a distribution of cells with discontinuities does not vary in a direction transverse to a curve direction.

Another example display of any preceding display is provided, wherein a distribution of cells with discontinuities on the curved portion of the display is to balance one or more of brightness of light and color of light emitted through the distributed discontinuities.

Another example display of any preceding display is provided, further including a substantially flat portion, wherein the discontinuity is substantially on a side of the cell in a direction of the substantially flat portion.

Another example display of any preceding display is provided, further including a second curved portion coupled to the curved portion and substantially reflectively symmetrical to the curved portion about the coupling, wherein discontinuities of the second curved portion are substantially reflectively symmetrical to discontinuities of the curved portion about the coupling.

An example method of making a display with a curved portion is provided. The method includes forming a capacitive sensor mesh layer with a plurality of cells, and introducing one or more discontinuities to a cell face of a cell of the plurality cells based at least in part on a position of the cell on the curved portion.

Another example method of any preceding method is provided, the method further including positioning an illuminating layer below the capacitive sensor mesh layer to substantially align each of one or more lights of the illuminating layer with a corresponding cell of the plurality of cells and coupling the illuminating layer to the capacitive sensor mesh layer, wherein a discontinuity is at least based at least in part on a light corresponding to the cell.

An example method of using a display with a curved portion is provided. The method includes an operation of emitting from a light of an illuminating layer through a cell of a capacitive sensor mesh layer with a plurality of cells, the cell with a discontinuity based at least in part on a position of the cell on the curved portion.

Another example method of any preceding method, includes an operation of controlling, by a processing system, the emitted light based at least in part on the discontinuity.

An example system of making a display with a curved portion is provided. The system includes means for forming a capacitive sensor mesh layer with a plurality of cells and means for introducing one or more discontinuities to a cell face of a cell of the plurality cells based at least in part on a position of the cell on the curved portion.

Another example system of any preceding system is provided, the system further including means for positioning an illuminating layer below the capacitive sensor mesh layer to substantially align each of one or more lights of the illuminating layer with a corresponding cell of the plurality of cells and means for coupling the illuminating layer to the capacitive sensor mesh layer, wherein a discontinuity is at least based at least in part on a light corresponding to the cell.

An example system of using a display with a curved portion is provided, the system including light means for emitting from a light of an illuminating layer through a cell of a capacitive sensor mesh layer with a plurality of cells, the cell with a discontinuity based at least in part on a position of the cell on the curved portion.

Another example system of any preceding system, includes means for controlling the emitted light based at least in part on the discontinuity.

While this specification contains many specific implementation details, these should not be construed as limitations on the scope of any inventions or of what may be claimed, but rather as descriptions of features specific to particular implementations of a particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A display with a curved portion, comprising:
an illuminating layer including a plurality of lights; and
a capacitive sensor mesh layer including a plurality of cells, wherein each cell of the plurality of cells includes a cell face that has a discontinuity in the cell face based at least in part on a position of the each cell of the plurality of cells on the curved portion and on a position of the cell face relative to one or more of the plurality of lights in the illuminating layer, wherein a distribution of discontinuities in the plurality of cells of the curved portion of the display balances brightness of light or color of light emitted through the distributed discontinuities.

2. The display of claim 1, wherein the capacitive sensor mesh layer overlays the illuminating layer in the display and wherein a characteristic of the discontinuity is based at least in part on a position of the each cell relative to the illuminating layer.

3. The display of claim 2, wherein the characteristic of the discontinuity is a dimension of the discontinuity.

4. The display of claim 2, wherein the display is an element of a computing device having a processor and a memory, the processor to execute functions stored in the memory, the processor to control a characteristic of a light of the plurality of lights based at least in part on the discontinuity.

5. The display of claim 2, wherein one or more cells of the plurality of cells are each aligned with a corresponding light of the plurality of lights, and wherein the position of the each cell relative to the illuminating layer is a position of the each cell relative to a light corresponding to the each cell.

6. The display of claim 5, wherein the characteristic of the discontinuity is proportional to a characteristic of the light corresponding to the each cell.

7. The display of claim 5, wherein the characteristic of the discontinuity is based at least in part on an orientation of the corresponding light.

8. The display of claim 5, wherein the characteristic of the discontinuity is a magnitude of the discontinuity, and wherein the magnitude of the discontinuity is based at least in part on a magnitude of curvature at the position.

9. The display of claim 1, wherein a characteristic of the discontinuity in the cell face is based at least in part on a transverse position of the each cell on the display.

10. The display of claim 1, wherein the discontinuity in the cell face differs from discontinuities of cell faces of cells adjacent to the each cell that are not shared between the each cell and the cells adjacent to the each cell.

11. The display of claim 1, wherein the discontinuity is one or more of a gap in the cell face, a partial gap in the cell face, a widening of the cell face, and a narrowing of the cell face.

12. The display of claim 1, wherein a distribution of cells with discontinuities is based at least in part on a magnitude of curvature of the curved portion of the display.

13. The display of claim 1, wherein a distribution of cells with discontinuities does not vary in a direction transverse to a curve direction.

14. The display of claim 1, further comprising:
a substantially flat portion, wherein the discontinuity is substantially on a side of the each cell in a direction of the substantially flat portion.

15. The display of claim 1, further comprising:
a second curved portion coupled to the curved portion and substantially reflectively symmetrical to the curved portion about the coupling, wherein discontinuities of the second curved portion are substantially reflectively symmetrical to discontinuities of the curved portion about the coupling.

16. The display of claim 1, wherein the discontinuity is based at least in part on an orientation of a light of the plurality of lights adapted to emit light through the each cell.

17. A method of making a display with a curved portion, comprising:
forming a capacitive sensor mesh layer with a plurality of cells; and
introducing one or more discontinuities to a cell face of a cell of the plurality of cells based at least in part on a position of the cell on the curved portion and on a position of the cell face relative to one or more lights in an illuminating layer, wherein a distribution of discontinuities in the plurality of cells of the curved portion of the display balances brightness of light or color of light emitted through the distributed discontinuities.

18. The method of claim 17, further comprising:
positioning the illuminating layer below the capacitive sensor mesh layer to substantially align each of one or more lights of the illuminating layer with a corresponding cell of the plurality of cells; and
coupling the illuminating layer to the capacitive sensor mesh layer, wherein a discontinuity is based at least in part on a light corresponding to the cell.

19. A method of operating a display with a curved portion, comprising:
emitting light from an illuminating layer through a cell of a capacitive sensor mesh layer having a plurality of cells, the cell having a discontinuity based at least in part on a position of the cell on the curved portion and on a position of the cell relative to the illuminating layer; and
controlling, by a processing system, the emitted light based at least in part on the discontinuity.

* * * * *